(12) United States Patent
Eckstein et al.

(10) Patent No.: US 11,336,142 B2
(45) Date of Patent: May 17, 2022

(54) ELECTRICAL MACHINE INCLUDING CLOSURE WALLS FOR WINDING SLOTS

(71) Applicant: Bayerische Motoren Werke Aktiengesellschaft, Munich (DE)

(72) Inventors: Nicolas Eckstein, Munich (DE); Thorsten Rienecker, Munich (DE); Philipp Schlag, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/966,120

(22) PCT Filed: Feb. 22, 2019

(86) PCT No.: PCT/EP2019/054404
§ 371 (c)(1),
(2) Date: Jul. 30, 2020

(87) PCT Pub. No.: WO2019/166334
PCT Pub. Date: Sep. 6, 2019

(65) Prior Publication Data
US 2021/0036571 A1    Feb. 4, 2021

(30) Foreign Application Priority Data
Feb. 27, 2018   (DE) ...................... 10 2018 202 945.8

(51) Int. Cl.
*H02K 3/48*   (2006.01)
*H02K 3/487*  (2006.01)
(Continued)

(52) U.S. Cl.
CPC ............. *H02K 3/487* (2013.01); *H02K 1/265* (2013.01); *H02K 3/04* (2013.01); *H02K 3/345* (2013.01)

(58) Field of Classification Search
CPC ............ H02K 1/265; H02K 3/04; H02K 3/34; H02K 3/345; H02K 3/46; H02K 3/48; H02K 3/487
(Continued)

(56) References Cited

U.S. PATENT DOCUMENTS

| 3,719,988 A | 3/1973 | Nielsen |
| 4,075,522 A | 2/1978 | Hoffman |

(Continued)

FOREIGN PATENT DOCUMENTS

| CN | 101213722 A | 7/2008 |
| CN | 102347652 A | 2/2012 |

(Continued)

OTHER PUBLICATIONS

Yoshida et al., English Machine Translation of JP 2017-200343 (Year: 2017).*

(Continued)

*Primary Examiner* — Rashad H Johnson
(74) *Attorney, Agent, or Firm* — Crowell & Moring LLP

(57) ABSTRACT

An electrical machine includes a rotor with a plurality of winding slots in which wire windings are arranged. A pair of covering slides is associated with each winding slot, wherein each covering slide has a closure wall, and the closure walls of the pairs of covering slides close the winding slots which are associated with them on that side of the winding slots which faces radially outward. Mutually facing longitudinal ends of the closure walls of the same pair of covering slides overlap in the assembled state in such a way that the closure walls of the same pair of covering slides overlap only in sections.

9 Claims, 4 Drawing Sheets

(51) Int. Cl.
  *H02K 1/26* (2006.01)
  *H02K 3/04* (2006.01)
  *H02K 3/34* (2006.01)

(58) Field of Classification Search
  USPC .......... 310/179, 214, 215, 216.105, 216.115, 310/216.132
  See application file for complete search history.

(56) References Cited

U.S. PATENT DOCUMENTS

| | | | |
|---|---|---|---|
| 4,709,181 | A | 11/1987 | Derderian |
| 5,763,978 | A | 6/1998 | Uchida et al. |
| 2002/0153801 | A1* | 10/2002 | Siems ............... H02K 3/48 |
| | | | 310/215 |
| 2004/0145267 | A1* | 7/2004 | Lowry ............... H02K 3/487 |
| | | | 310/215 |
| 2008/0203844 | A1 | 8/2008 | Klaussner |
| 2010/0079028 | A1* | 4/2010 | Turner ............... H02K 3/487 |
| | | | 310/214 |
| 2011/0156525 | A1 | 6/2011 | Takeshita et al. |
| 2012/0025639 | A1 | 2/2012 | Zywot et al. |
| 2014/0319959 | A1 | 10/2014 | Kaiser et al. |
| 2015/0028711 | A1 | 1/2015 | Bulatow et al. |
| 2016/0043613 | A1 | 2/2016 | Patel et al. |
| 2017/0338711 | A1* | 11/2017 | Yu ............... H02K 3/46 |
| 2021/0159751 | A1* | 5/2021 | Tavakoli ............... H02K 3/51 |

FOREIGN PATENT DOCUMENTS

| | | |
|---|---|---|
| CN | 202435161 U | 9/2012 |
| CN | 202550743 U | 11/2012 |
| CN | 103532269 A | 1/2014 |
| CN | 106712359 A | 5/2017 |
| DE | 103 00 796 A1 | 7/2004 |
| DE | 10 2014 105 425 A1 | 10/2014 |
| EP | 1 947 755 A1 | 7/2008 |
| JP | 2017-200343 A | 11/2017 |

OTHER PUBLICATIONS

International Search Report (PCT/ISA/210) issued in PCT Application No. PCT/EP2019/054404 dated May 29, 2019 with English translation (six (6) pages).

Japanese-language Written Opinion (PCT/ISA/237) issued in PCT Application No. PCT/EP2019/054404 dated May 29, 2019 (seven (7) pages).

German-language Search Report issued in German Application No. 10 2018 202 945.8 dated Oct. 10, 2018 with partial English translation (12 pages).

Chinese-language Office Action issued in Chinese Application No. 201980005267.0 dated Oct. 26, 2021 with English translation (14 pages).

* cited by examiner

ELECTRICAL MACHINE INCLUDING CLOSURE WALLS FOR WINDING SLOTS

BACKGROUND AND SUMMARY OF THE INVENTION

The invention relates to an electrical machine with wire windings, which are wound in winding slots, and covering slides which close the winding slots. The invention further relates to a vehicle comprising an electrical machine of this kind.

The prior art discloses stacking rotor laminations one on the other in order to in this way form a laminated core which forms a rotor core. This laminated core has winding slots which run in the axial direction and are open radially to the outside. Wire windings are introduced into the winding slots. After the winding slots are closed by covering slides, the wire windings are encapsulated by injection molding, wherein intermediate spaces in the winding slots are also filled with impregnating material. During the encapsulation by injection molding, the rotor is surrounded by a Viton ring which is intended to prevent the outer surfaces of the laminated core being covered by impregnating material, but rather the impregnating material is guided into the interior of the laminated core, i.e. into the winding slots.

In a production method of this kind, the laminated core of the rotor usually has a length tolerance of plus/minus a lamination thickness. However, the covering slides for closing the winding slots are manufactured with a specific length, and therefore an air gap could be produced at the longitudinal end of the covering slides owing to the tolerance of the length of the laminated core. This can lead to the Viton ring not withstanding the high loading during the injection-molding process and being pushed outward. This in turn leads to impregnating material adhering to the outer surface of the laminated core. This is undesirable and leads to increased work, for example in order to remove the impregnating material again.

Therefore, one object of the present invention is to at least partially eliminate the abovementioned disadvantages. This object is achieved by an electrical machine and by a motor vehicle according to the claimed invention.

According to one exemplary embodiment of the invention, provision is made of an electrical machine comprising a rotor with a plurality of winding slots in which wire windings are arranged, wherein a pair of covering slides is associated with each winding slot, wherein each covering slide has a closure wall and the closure walls of the pairs of covering slides close the winding slots which are associated with them on that side of the winding slots which faces radially outward, wherein mutually facing longitudinal ends of the closure walls of the same pair of covering slides overlap in the fitted state in such a way that the closure walls of the same pair of covering slides overlap only in sections. This exemplary embodiment has the advantage that a variability in respect of the total length of a pair of covering slides is created owing to the overlapping covering slides of one pair, it being possible for this variability to be brought into line with the length of the winding slot which is subject to tolerances. In other words, the total length of a pair of covering slides can be adjusted. The air gap at the longitudinal ends of the covering slides is closed owing to this design. Therefore, the formation of an air gap at the longitudinal ends of the pair of covering slides is suppressed, and therefore no impregnating material can escape. Therefore, the advantages can be summarized as radial leaktightness of the rotor being achieved during encapsulation by injection molding and as the possibility of an expensive Viton ring being dispensed with.

According to a further exemplary embodiment of the invention, the closure walls of a pair of covering slides each have a first longitudinal section and a second longitudinal section, wherein the second longitudinal section has a lower maximum thickness than the first longitudinal section, measured along a radial direction of the rotor, and wherein the respectively second longitudinal sections of a pair face one another.

According to a further exemplary embodiment of the invention, the electrical machine is designed such that, in the assembled state of the pair of covering slides, the second longitudinal sections of a pair of covering slides overlap in sections and, in the overlapping region, a thickness of the two second longitudinal sections together is not greater than 110% of the maximum thickness of the first longitudinal sections, measured along a radial direction of the rotor.

According to a further exemplary embodiment of the invention, the electrical machine is designed such that the closure wall, at the transition from the first longitudinal section to the second longitudinal section, continues into the second longitudinal section substantially with half of the cross section of the first longitudinal section.

According to a further exemplary embodiment of the invention, the closure wall of each covering slide has a rectangular cross section (perpendicular to the longitudinal direction of the covering slide).

According to a further exemplary embodiment of the invention, the electrical machine is designed such that the covering slides each have two side walls which extend from the closure wall into the winding slot and are connected to one another on that side which is averted from the closure wall. This firstly serves for filling the cavity in the winding slot after the introduction of the wire winding and secondly the side walls support the wire winding as it is being encapsulated by injection molding.

According to a further exemplary embodiment of the invention, the electrical machine is designed such that the covering slides each have a side wall which is connected to the closure wall in cross section, perpendicular to the longitudinal direction of the covering slides, at both ends and therebetween extends into the winding slot in the form of an arc.

The present invention further provides a motor vehicle comprising an electrical machine of this kind.

A preferred exemplary embodiment of the present invention will be described below with reference to the appended drawings.

DETAILED DESCRIPTION OF THE DRAWINGS

Figure 1:
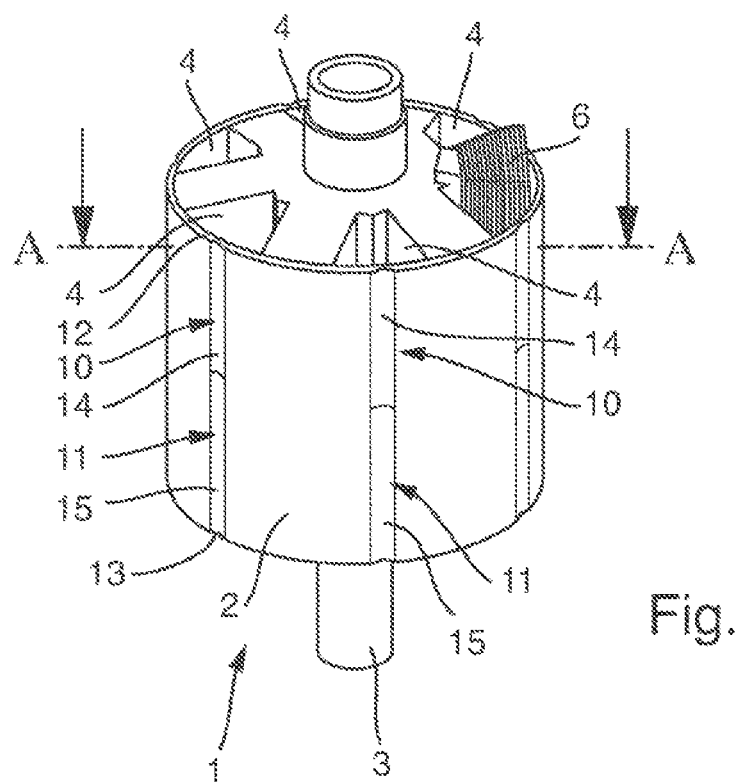
FIG. 1 schematically shows a rotor of an electrical machine according to one exemplary embodiment of the present invention.
Figure 2:
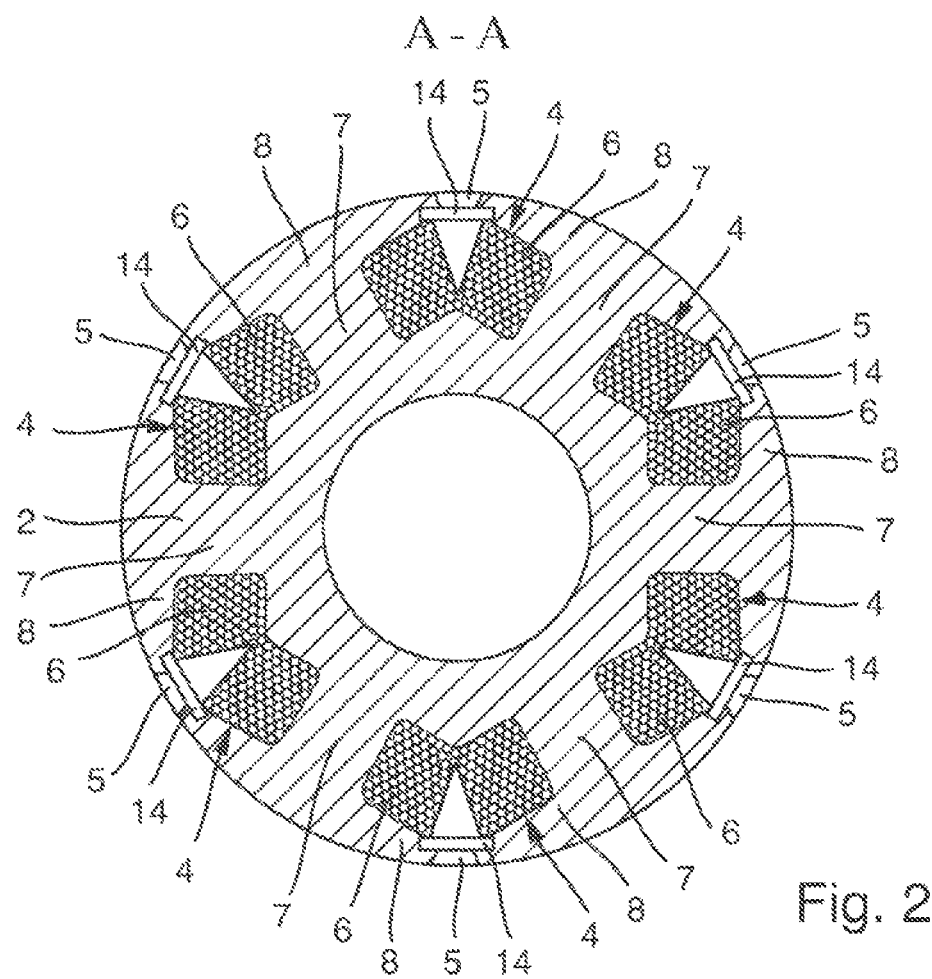
FIG. 2 schematically shows a cross section A-A through the rotor from FIG. 1.
Figure 3:
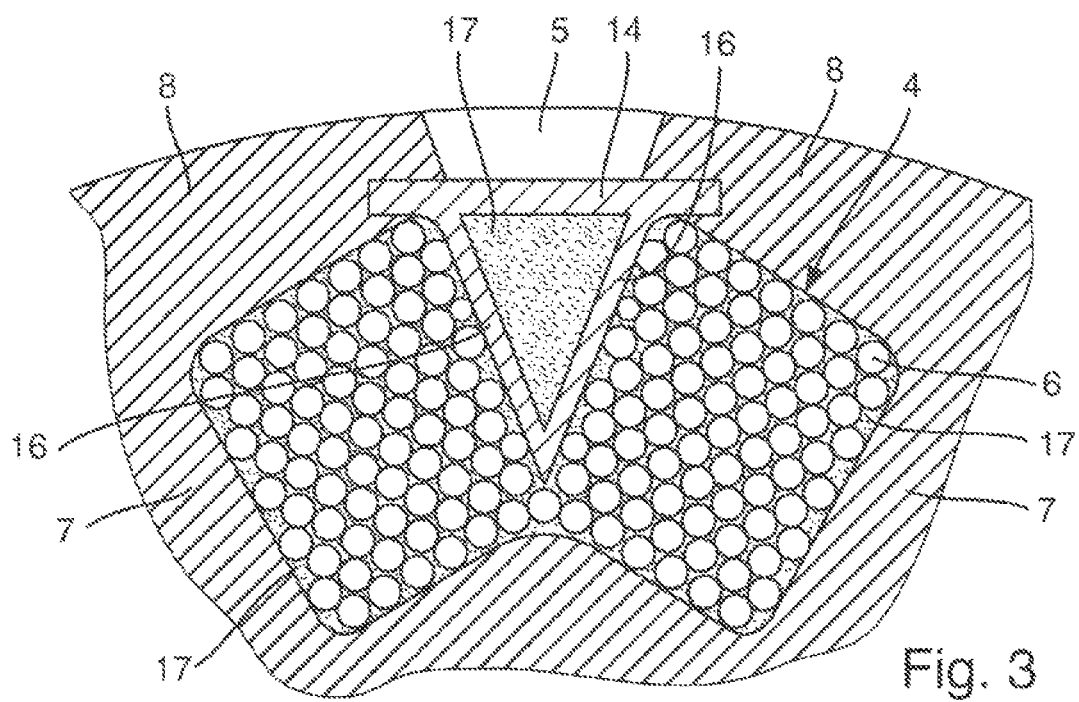
FIG. 3 shows a view of a detail of an excerpt from FIG. 2, which view schematically shows a cross section through a winding slot together with covering slides.

FIGS. 1 to 3 schematically show a rotor 1 and also details of this rotor according to one exemplary embodiment of the present invention. The electrical machine can be an electric motor or a generator. The rotor 1 has a rotor body 2 and a rotor shaft 3 which extends centrally through the rotor body. The rotor body 2 is constructed from rotor laminations which are stacked one on the other along an axial direction (i.e. along the longitudinal direction of the rotor shaft 3). The stack of laminations which is designed in this way and forms the rotor body 2 has a plurality of winding slots 4 which run axially over the entire length of the stack of laminations and extend through the stack of laminations and are opened radially on the outside over their entire length by means of winding slot openings 5 (see FIG. 2). A winding wire can be wound into the winding slots 4 via the winding slot openings 5 in order to provide the rotor with wire windings 6. More precisely, in each case one pole core 7 with a pole shoe 8 located radially on it is formed between two winding slots 4 which are adjacent in the circumferential direction of the rotor 1 (see FIG. 2 in particular), wherein the pole core 7 and the pole shoe 8 are of integral, in particular monolithic, design. Each wire winding 6 is wound around a pole core 7. The pole shoe 8 spans the pole core 7 and the wire winding 6 which is wound around the pole core. In each case one winding slot opening 5, which extends from one longitudinal end of the rotor body 2 to the other longitudinal end of the rotor body 2, runs between two pole shoes 8 which are adjacent in the circumferential direction of the rotor 1.

After the rotor body 2 is provided with the wire windings 6, the winding slot openings 5 are closed by pairs of covering slides 10, 11 (see FIGS. 1, 2 and 3 in particular).

Figure 4:
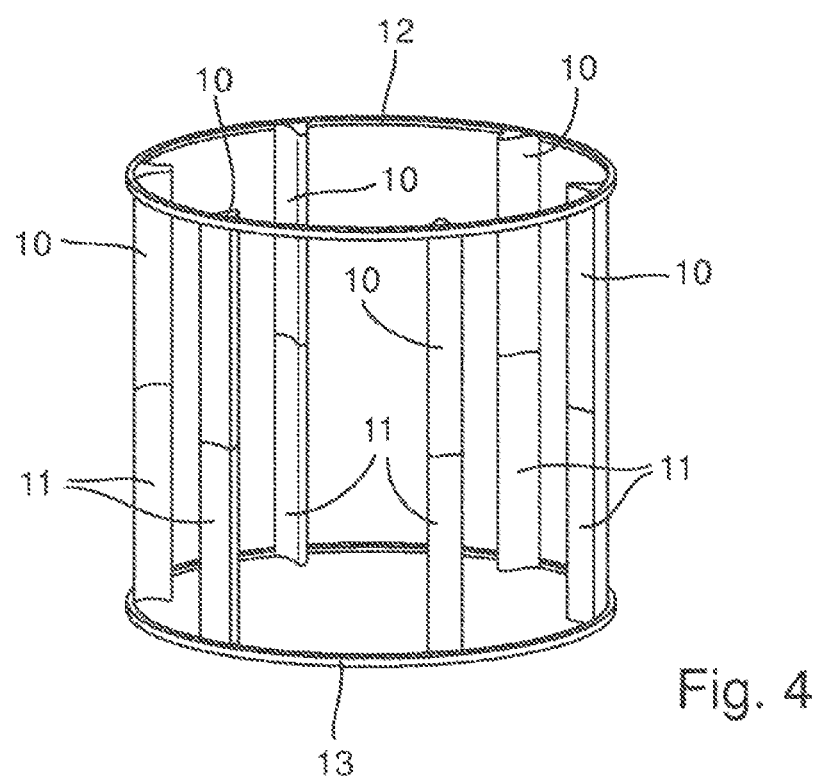
FIG. 4 shows a covering slide assembly of the rotor from FIG. 1.

The covering slides are described in more detail with reference to FIG. 4 which illustrates a covering slide assembly. The fitted covering slides are illustrated in FIGS. 1 to 3. Each pair of covering slides 10, 11 is associated with one winding slot opening 5 and comprises a first covering slide 10 and a second covering slide 11 which face one another at in each case one longitudinal end. The respectively other longitudinal ends of the covering slides 10, 11 are connected to supporting rings 12, 13. More precisely, the longitudinal end of the first covering slide 10 is integrally, in particular monolithically, connected to the supporting ring 12 and the longitudinal end of the second covering slide 11 is integrally, in particular monolithically, connected to the supporting ring 13. The covering slide assembly illustrated in FIG. 4 therefore consists of an upper and a lower half which are each of integral, in particular monolithic, design. The covering slides 10, 11 or the covering slide assembly are/is preferably composed of a thermoset material. This provides a degree of inherent stiffness, and therefore the covering slides are not pushed out of their predetermined positions during encapsulation of the wire windings 6 by injection molding. The use of other materials, such as a thermoplastic for example, is likewise possible.

Each covering slide 10, 11 has a closure wall 14, 15 which extends between two pole shoes 8 which are adjacent in the circumferential direction and closes substantially half (divided with respect to its longitudinal direction) of the winding slot opening 5. On their sides which face inward, the closure walls 14, 15 can optionally be provided with one or more side walls 16. In the case of the exemplary embodiment illustrated in FIGS. 2 and 3, the covering slides 10, 11 each have two side walls 16 which extend from the closure wall 14, 15 into the winding slot 4 and are connected to one another on that side which is averted from the closure wall 14. The closure wall 14 is integrally, in particular monolithically, formed with the side wall/walls 16. An embodiment in which covering slides 10, 11 each have a side wall which is connected to the closure wall 14, 15 in cross section, perpendicular to the longitudinal direction of the covering slides 10, 11, at both ends and therebetween extends into the winding slot 4 in the form of an arc would likewise be possible.

After the covering slides 10, 11 are fitted and close the winding slot openings 5, impregnating material is injected into intermediate spaces 17 which are formed, for example, between adjacent winding wire sections of the wire windings 6 and also between the closure wall 14, 15 and the side wall/walls 16 of the covering slides 10, 11, the impregnating material completely filling these intermediate spaces 17 as far as possible. The impregnating material used can be, for example, resin, thermoplastic or thermoset plastic. In this case, injection preferably takes place at the longitudinal ends of the rotor 1.

Figure 5A:
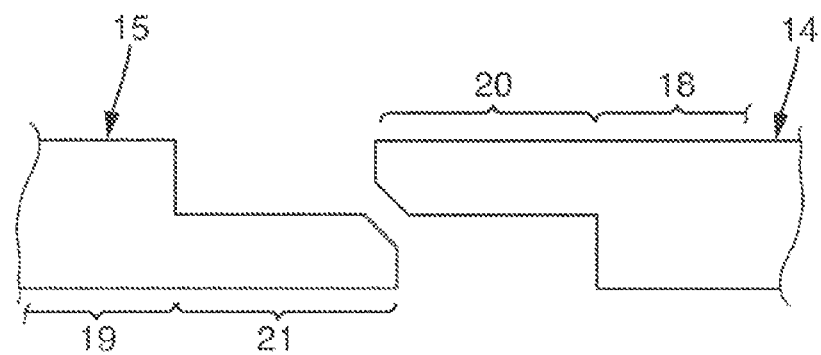
FIG. 5a schematically shows sections of a pair of covering slides.
Figure 5B:
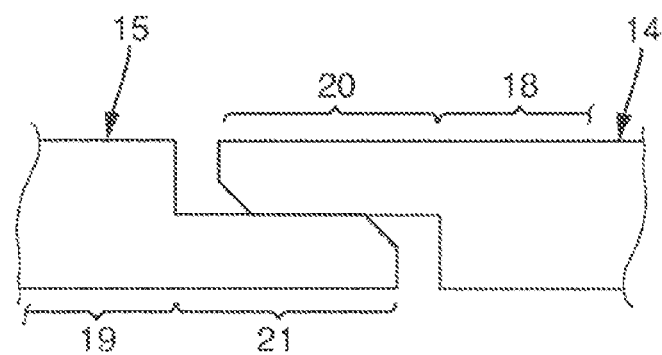
FIG. 5b schematically shows the pair of covering slides from FIG. 5a in an overlapping state.

As already described and clearly shown in FIGS. 5a and 5b, a winding slot opening 5 is closed not only by one single covering slide but rather by a pair 10, 11 of covering slides, wherein the covering slides 10, 11 overlap (only) in sections. More precisely, each closure wall 14, 15 has a first longitudinal section 18, 19 and a second longitudinal section 20, 21. In this case, the second longitudinal sections 20, 21 of the covering slides 10, 11 of a pair 10, 11 of covering slides are of complementary design, and therefore the covering slides can overlap without their joint cross-sectional area (i.e. cross section perpendicular to the longitudinal direction of the covering slides) being substantially larger than the cross-sectional area of the first longitudinal sections 18, 19. The first longitudinal sections 18, 19 preferably have a cross-sectional area (each on its own) which is substantially twice the size of the cross-sectional area of the second longitudinal sections 20, 21 (each on its own). The cross sections of both the first and the second longitudinal sections are preferably rectangular. In the fitted state, the second longitudinal sections 20, 21 overlap at least in sections. The second longitudinal section 20 preferably does not adjoin the first longitudinal section 19, but rather a certain gap remains. Similarly, the second longitudinal section 21 preferably does not adjoin the first longitudinal section 18. The side wall/walls 16 is/are provided either only along the first sections 18, 19 or extend over the entire covering slide length and, like the closure walls 14, 15, are equipped with a similar complementary overlapping option along the second longitudinal section 20, 21.

An exemplary embodiment in which the covering slides of one pair overlap in a simple manner has been described above, but it is of course also possible for the covering slides of one pair to have several teeth, similarly to a labyrinth seal.

While the invention has been illustrated and described in detail in the drawings and in the above description, this illustration and description are intended to be understood as illustrative or exemplary and not as restrictive, and the intention is not to restrict the invention to the disclosed exemplary embodiment. The mere fact that specific features are mentioned in various dependent claims is not intended to mean that a combination of these features could not also be used in an advantageous manner.

What is claimed is:

1. An electrical machine, comprising:
a rotor with a plurality of winding slots in which wire windings are arranged;
a pair of covering slides associated with each winding slot, wherein
each covering slide has a closure wall, and the closure walls of the pairs of covering slides close the winding slots which are associated with them on a side of the winding slots which faces radially outward, and
mutually facing longitudinal ends of the closure walls of a same pair of covering slides overlap in an assembled state such that the closure walls of the same pair of covering slides overlap only in sections and a gap is formed between surfaces of the closure walls of the same pair that face radially outward.

2. The electrical machine according to claim 1, wherein
the closure walls of a pair of covering slides each have a first longitudinal section and a second longitudinal section,
the second longitudinal section has a smaller maximum thickness than the first longitudinal section, measured along a radial direction of the rotor, and
the respective second longitudinal sections of the pair of covering slides face one another.

3. The electrical machine according to claim 2, wherein
in the assembled state of the pair of covering slides, the second longitudinal sections of a pair of covering slides overlap in sections, and
in the overlapping region, a thickness of the two second longitudinal sections together is not greater than 110% of a maximum thickness of the first longitudinal sections, measured along a radial direction of the rotor.

4. The electrical machine according to claim 3, wherein
the closure wall, at a transition from the first longitudinal section to the second longitudinal section, continues into the second longitudinal section with half of the cross section of the first longitudinal section.

5. The electrical machine according to claim 2, wherein
the closure wall, at a transition from the first longitudinal section to the second longitudinal section, continues into the second longitudinal section with half of the cross section of the first longitudinal section.

6. The electrical machine according to claim 1, wherein
the closure wall of each covering slide has a rectangular cross section.

7. The electrical machine according to claim 1, wherein
the covering slides each have two side walls which extend from the closure wall into the winding slot and are connected to one another on a side which is averted from the closure wall.

8. The electrical machine according to claim 1, wherein
the covering slides each have a side wall which is connected to the closure wall in cross section perpendicular to the longitudinal direction of the covering slides, at both ends and therebetween extends into the winding slot in the form of an arc.

9. A motor vehicle comprising an electrical machine according to claim 1.

* * * * *